Figure 1:
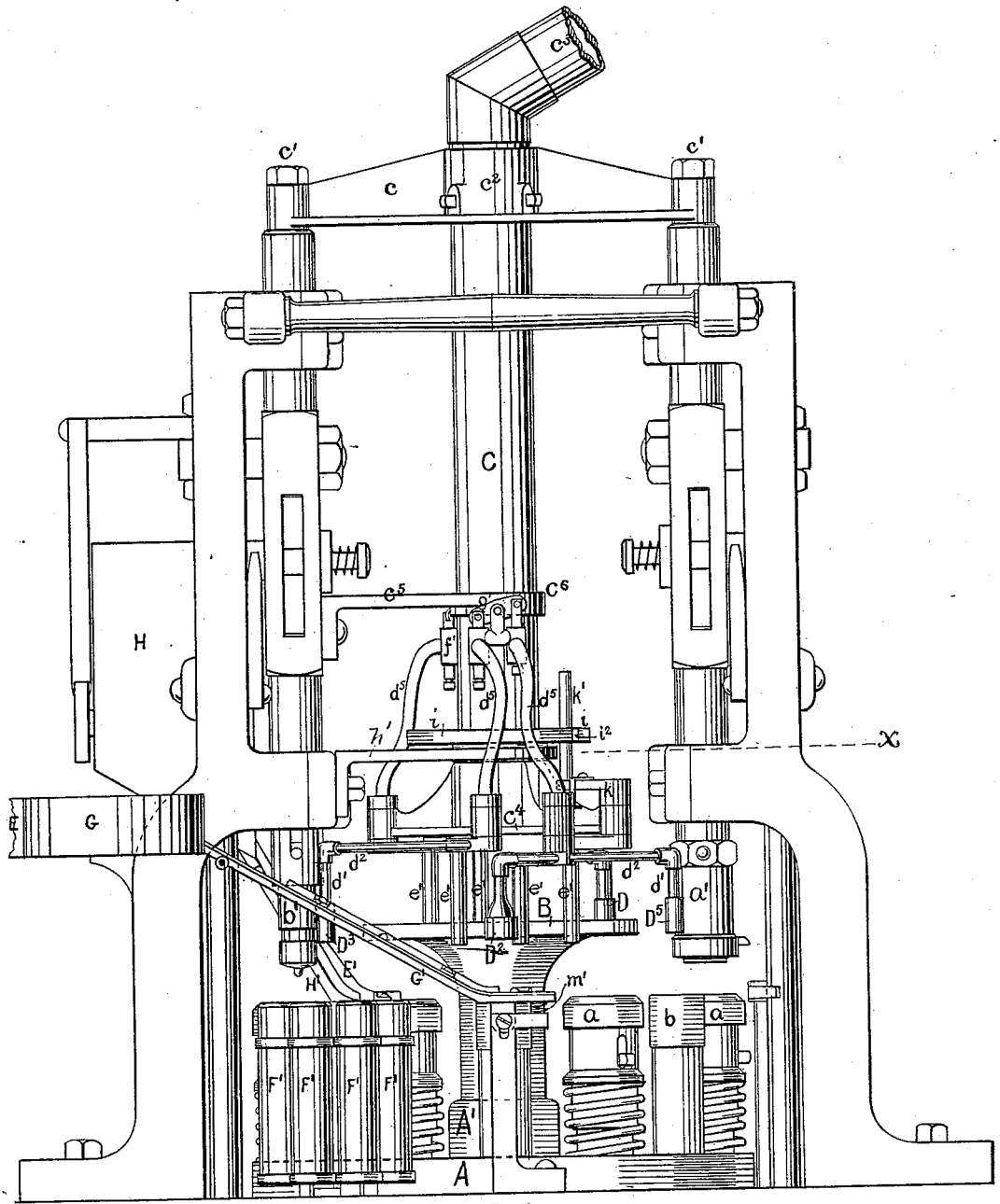

(Model.)

D. H. CAMPBELL.
MACHINE FOR MAKING BUTTONS.

No. 297,495. Patented Apr. 22, 1884.

WITNESSES:
Philip F. Larner
Howell Bartte

INVENTOR:
Duncan H. Campbell
By Wm C Wood
Attorney (Model.)
D. H. CAMPBELL.
MACHINE FOR MAKING BUTTONS.
No. 297,495. Patented Apr. 22, 1884.
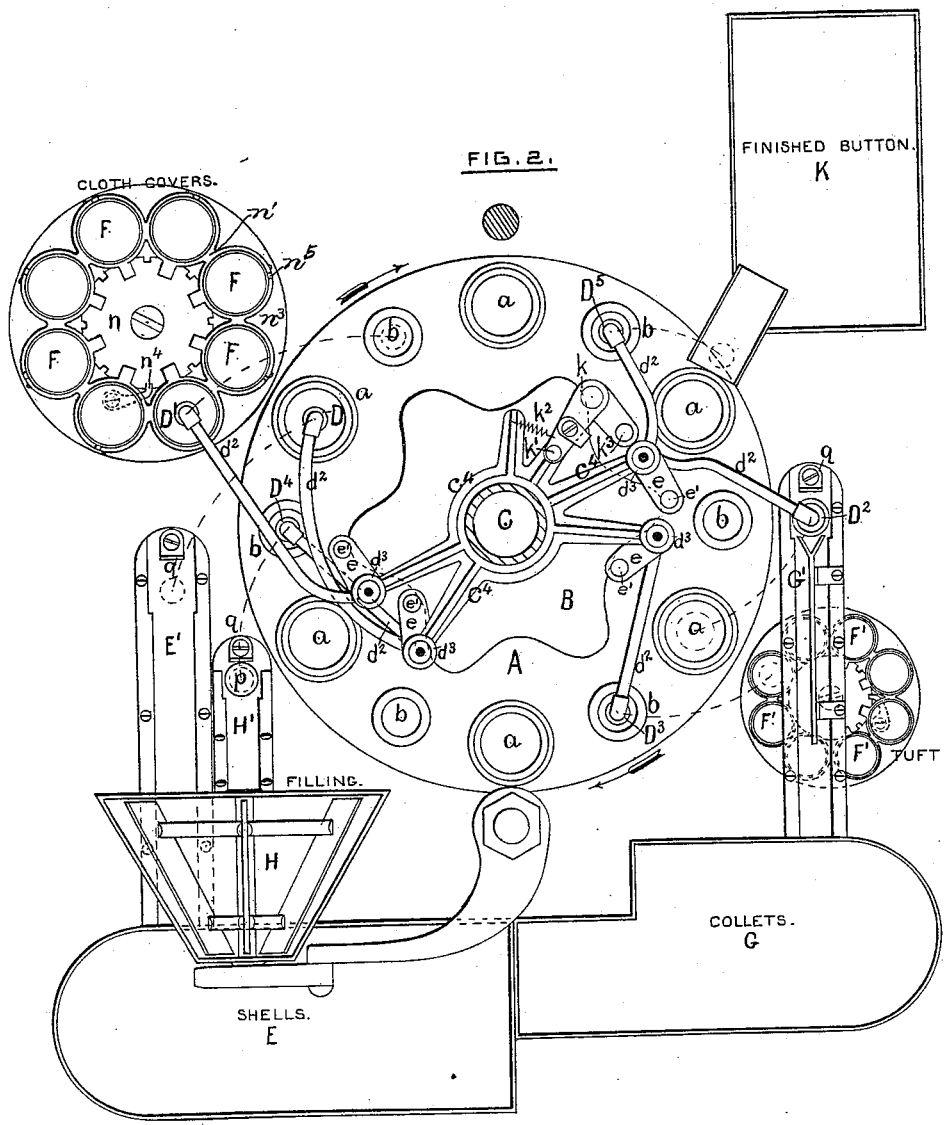

(Model.)
5 Sheets—Sheet 3.
D. H. CAMPBELL.
MACHINE FOR MAKING BUTTONS.
No. 297,495. Patented Apr. 22, 1884.
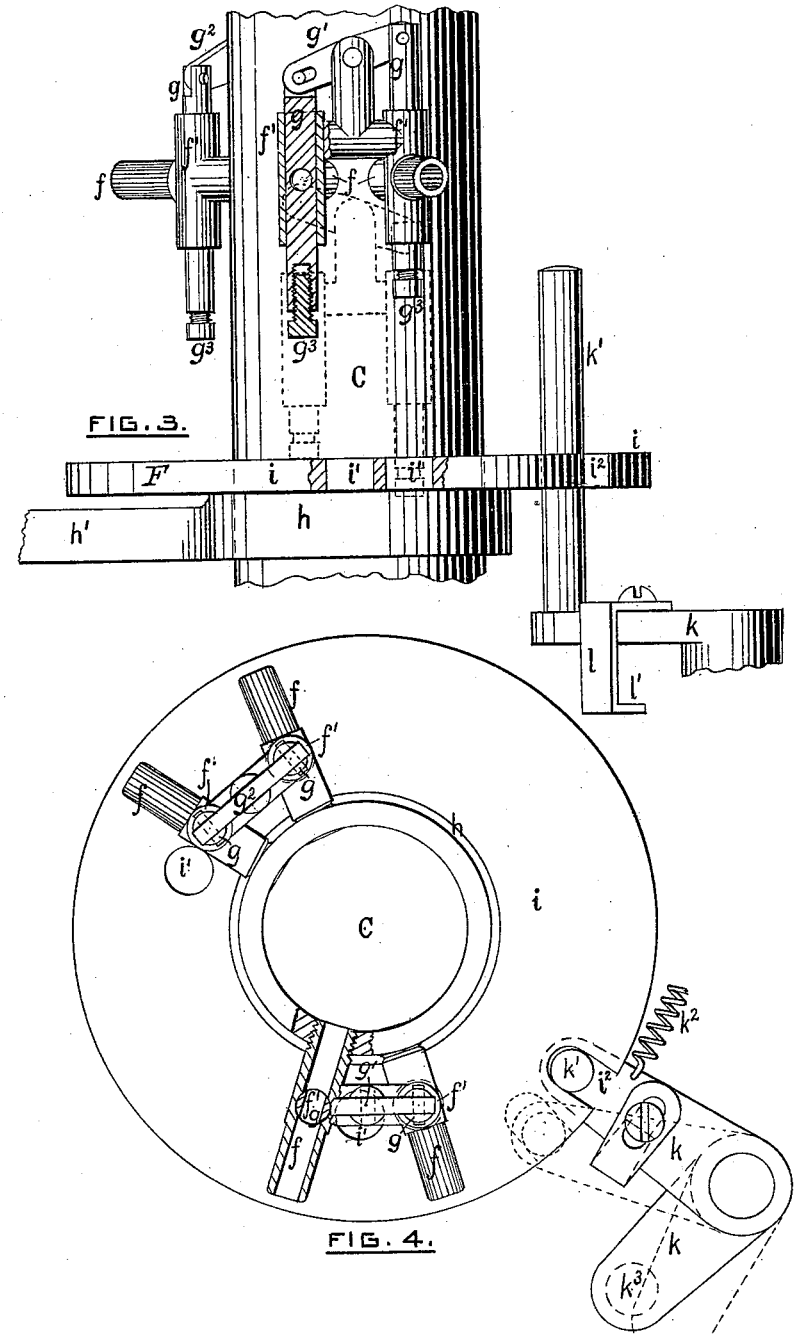
WITNESSES:
INVENTOR:
Duncan H. Campbell.

(Model.)
5 Sheets—Sheet 4.
D. H. CAMPBELL.
MACHINE FOR MAKING BUTTONS.
No. 297,495.
Patented Apr. 22, 1884.
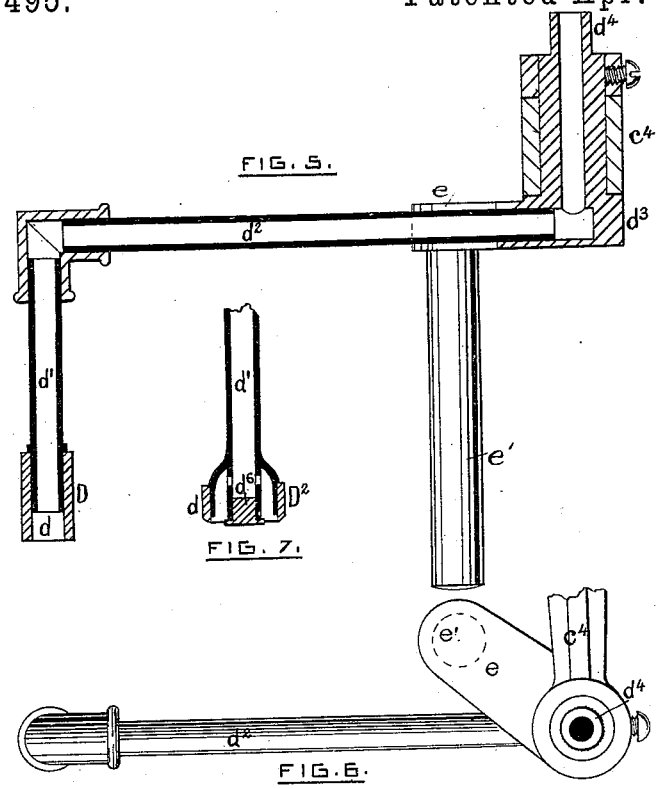
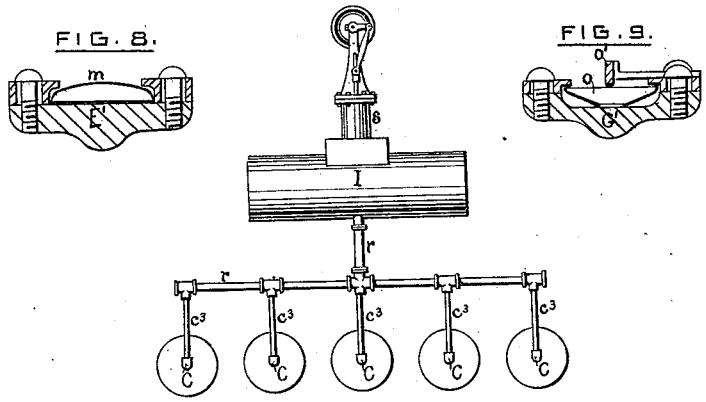
WITNESSES.
Philip F. Larner
Howell Bartte
INVENTOR:
Duncan H. Campbell
By Wm C Ward
Attorney (Model.)
D. H. CAMPBELL.
MACHINE FOR MAKING BUTTONS.
No. 297,495. Patented Apr. 22, 1884.
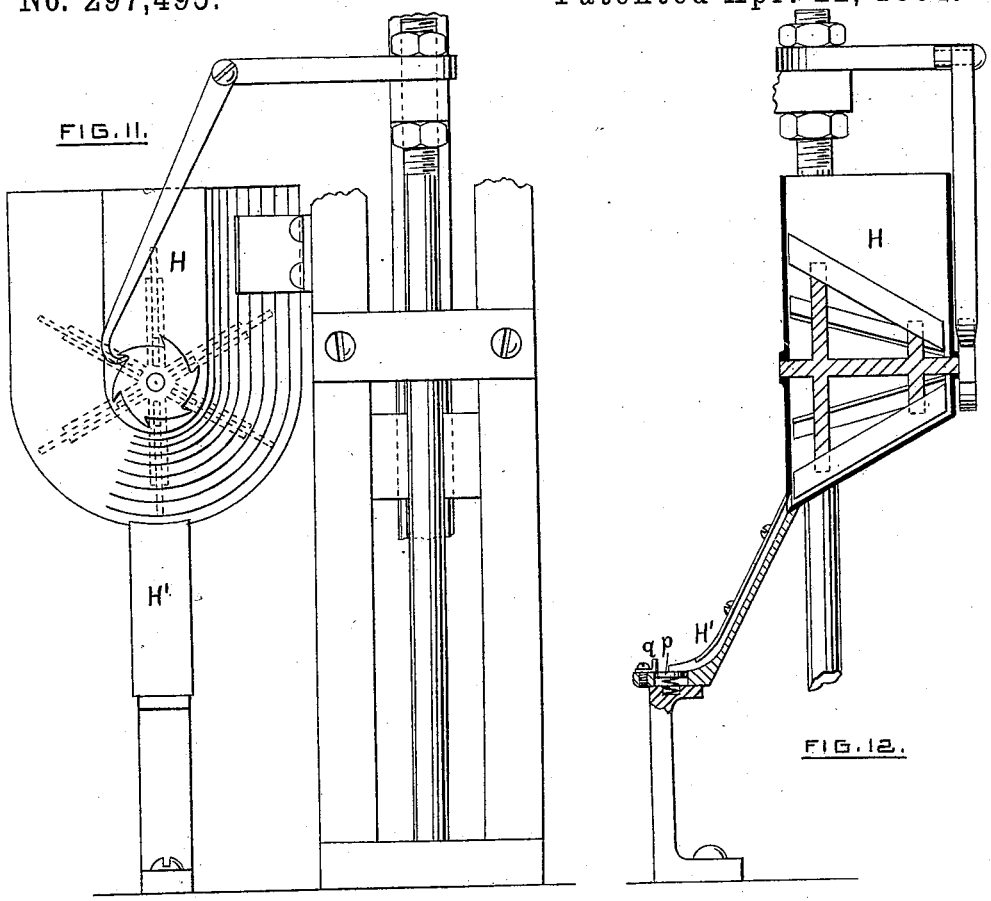
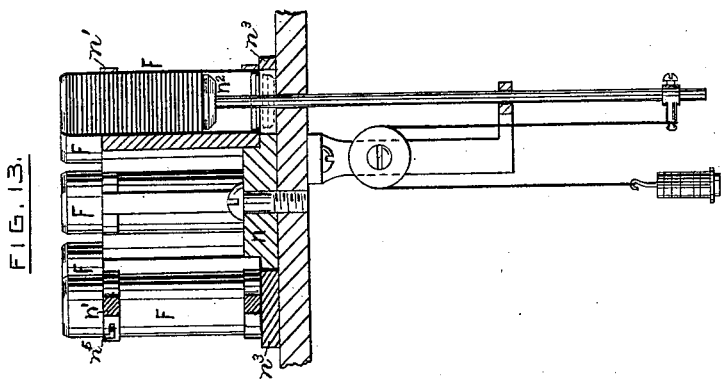
WITNESSES:
Philip H. Larner
Howell Bartle
INVENTOR:
Duncan H. Campbell
By [attorney signature]
Attorney

UNITED STATES PATENT OFFICE.

DUNCAN H. CAMPBELL, OF PAWTUCKET, RHODE ISLAND, ASSIGNOR TO HENRY B. METCALF, OF SAME PLACE, AND WILLIAM McCLEERY, OF BOSTON, MASSACHUSETTS.

MACHINE FOR MAKING BUTTONS.

SPECIFICATION forming part of Letters Patent No. 297,495, dated April 22, 1884.

Application filed June 8, 1881. (Model.)

*To all whom it may concern:*

Be it known that I, DUNCAN H. CAMPBELL, of Pawtucket, in the county of Providence and State of Rhode Island, have invented certain new and useful Improvements in Button-Making Machines; and I do hereby declare that the following specification, taken in connection with the drawings furnished and forming a part thereof, is a clear, true, and complete description of the several features of my invention.

My improvements relate to that class of machines in which co-operative dies are employed for uniting two or more parts to form a button; but said improvements are described and illustrated by me in connection with the manufacture of five-part buttons with co-operative dies, substantially as in the well-known "Wade machine." Said improvements are, however, also applicable to other button-making machines more or less widely differing in their organization.

The object of my improvements is to increase the productive capacity, and to reduce the cost of attendance to a minimum, by the employment of automatic feeding mechanism of a novel character, which can be reliably operated at high speed, is of such simplicity in construction as to be durable and reliable in operation, and is so organized with relation to the main portions of the machine as to cooperate therewith smoothly and in perfect harmony.

Instead of relying upon mechanically-organized grasping and delivering devices, operating after the manner of nippers, and in some cases after the manner of puncturing-forks, for feeding or delivering the parts to and removing the finished buttons from the dies, I employ cupules or "sucking-cups" with atmospheric pressure, made available at suitable proper intervals by a continuous partial vacuum mechanically induced, and an automatic control of said pressure adjacent to and affecting said cupules in their operation. So far as my knowledge extends, this pneumatic principle has never before been applied to button-making machinery, although I am aware that it has been employed in machines for making trunk-nails having brass filled heads; but in said machines, instead of effecting the release of a "filling" from a lifter by modifying the atmospheric pressure, as in my machine, said release was effected by mechanically-operated plungers, and, instead of employing a continuous partial vacuum, as in my machine, the partial vacuum in said prior machine was intermittingly induced by a pump, which was worked for each operation of the lifter. I am also aware that the pneumatic principle has heretofore been employed in twine-balling machines for conveying "tickets" from receptacles to hollow sucking balling-spindles by means of cupules or suckers; and I am still further aware that there have been employed in other connections suckers which embodied means within themselves for inducing a partial vacuum at each movement toward or upon the object to be lifted. The employment of a continuous partial vacuum, as in my machine, is deemed of material consequence, because a continuous reserve force is always available, which contributes greatly to reliability in the operation of the cupules.

After a full description thereof, the several novel features, devices, and combinations of devices embodied in my machine will be designated in the several claims hereunto annexed.

Referring to the five sheets of drawings, Figure 1, Sheet 1, is a side elevation of a button-making machine embodying my improvements and adapted to manufacture five-part buttons. Fig. 2, Sheet 2, is a partial plan view of the machine, mainly below line *x*, Fig. 1. Fig. 3, Sheet 3, is an enlarged view, partially in section, of the mechanism by which the control of the atmospheric pressure is effected. Fig. 4, Sheet 3, is a top view of the same, with some of its parts in section. Figs. 5 and 6, Sheet 4, are respectively sectional and top views of a cupule or "sucker" detached from the machine, but connected with its arms or levers. Fig. 7 is a sectional view of a cupule or sucker of novel construction, specially adapted to operate on "collets." Figs. 8 and 9 are respectively lateral sectional views of a "shell-chute," and a "collet-chute." Fig.

10, Sheet 4, illustrates the arrangement of a series of machines connected with a main vacuum-chamber and its air-pump. Fig. 11, Sheet 5, is a side view of the "filling-hopper," its chute, and a portion of the machine. Fig. 12 is a vertical section of the same. Fig. 13 is a partial side and sectional view of receptacles from which cloth disks are taken by the cupules.

The machine here shown has an intermittingly-revolved die-table, A, carrying six sets of dies, each set embracing a preliminary die, $a$, and a finishing-die, $b$, these dies being alternately arranged in a circle on the die-table. A much larger table, carrying twelve or more sets of dies, may be profitably employed with my feeding mechanism, thus proportionally increasing the capacity of the machine. Each of the preliminary dies $a$ receives the top shell of a button, and after the next movement of the table they also receive a cloth disk, which constitutes the cover of the finished button, and by means of an internal plunger in die $a$ said shell and cloth cover are forced upward into the hollow finishing-plunger $a'$, and left there. Each of the finishing-dies first receives a collet, and then, after the table has moved, a tuft-disk of cloth, and after a further movement of the table the cloth is forced through the eye of the collet by the tuft-plunger $b'$, after which the table moves, and said finishing-dies receive a paper filling on top of the tuft, and after a further movement of the table, when said finishing-dies $b$ are coincident with the finishing-plunger $a'$, the latter descends, and the shell and collet are interlocked or compressed, thus completing the button, which, after the next movement of the table, is removed from the finishing-die.

The picking up and ultimate delivery of the parts of a button occur while the die-table is at rest, and the conveying of said parts to positions above and coincident with the dies occurs while the table is rotating. In order that the picking-up movement shall occur next prior to or after the rotation of the table, and a lowering and delivering movement occur after the rotation of the table ceases, the feeding devices are connected with and operated by the vertically-reciprocating plungers, which operate only while the die-table is at rest. In order that the conveying movement of the feeding devices shall be harmonious and in exact time with the rotation and stoppage of the die-table, said conveying movement is obtained by the operative connection of the cupules with the die-table.

The die-table shown is novel, in that it is provided with the central vertical socket or standard, A', which is mounted upon and revolves with the table, and fixedly receives the base of the wheel-cam B, which, rotating with the table, imparts to the feeding-cupules all of their lateral motions, and also operates the shifting or valve-operating mechanism, whereby the atmospheric pressure is alternated, as hereinafter more fully described.

The cross-head $c$ of the machine is, as heretofore, connected with the sliding plungers and their rods $c'$; but it is constructed in a manner novel in these machines, in that it has a central collar, $c^2$, within which is firmly secured the vertical, cylindrical, local vacuum-chamber C, which, at its upper end, is united to a flexible pipe, $c^3$, communicating with an air-pump or with pipes connecting with a main vacuum-chamber, as hereinafter further described.

Attached to the lower end of the local vacuum-chamber is a spider-bracket, $c^4$, having numerous arms, upon which the feeding cupules or suckers are mounted, so that the ordinary vertical movements of the sliding plungers $a'$ and $b'$ and their rods $c'$ also impart to the feeding-cupules their vertical reciprocating movements. A bracket, $c^5$, attached to the frame of the machine, affords at its outer end an annular slide-bearing, $c^6$, for the lower portions of the vertically-reciprocating vacuum-chamber C.

The cupules or suckers here shown are six in number, for doing duty as follows: cupule D, for feeding shells; D', for cloth disks or covers; $D^2$, for collets; $D^3$, for cloth-tuft disks; $D^4$, for pasteboard or paper disks, (filling,) and $D^5$ for removing the finished button. With the exception of the cupule $D^2$, they are all constructed substantially alike, as indicated in Fig. 5; but they should be varied in size according to the dimensions of the parts which they deliver. Each of these cupules at its mouth is composed, preferably, of a short length of flexible rubber tubing, as at $d$, mounted at the lower end of a vertical pipe-arm, $d'$, which is connected at its upper end by an elbow with a horizontal pipe, $d^2$, which enters a hollow hub, $d^3$, to near its center, and said hub at its upper end is provided with a neck, $d^4$, properly serrated to be firmly engaged by a piece of flexible tubing, $d^5$, thereon, extending to and connecting with the local vacuum-chamber C.

The cupule $D^2$, Fig. 7, differs from all the rest in the construction of its mouth, there being therein a central elastic cushion or pad, $d^6$, which makes the mouth of the cupule annular instead of circular, as in all the others. This peculiar construction enables this cupule to close, with its central cushion, the eye of a collet, and its annular mouth is, therefore, coincident with the annular surface of the collet between its eye and periphery. Such of these cupules as operate at the same time may be and are connected to one hollow hub, $d^3$—as, for instance, D and $D^4$—which respectively deliver shells and paper fillings; also, $D^2$ and $D^5$, which respectively deliver collets and remove the finished buttons; but the cloth-feeders D' and $D^3$ have each a hub of their own, and are located at opposite sides of the machine. Each hub $d^3$ is sleeved in a vertical bearing at the outer end of an arm of the spider $c^4$, and is held thereto by a collar and set-screw, as clearly shown in Figs. 5 and 6, and each of said hubs $d^3$ has a horizontal arm, $e$, having at its outer end a rigid pendent arm or pin, $e'$. The flexible tubes $d^5$, which are not only flexible but elastic, and connect hubs $d^3$ with the local vacuum-chamber C, can be relied upon (if applied, as by me, with a slight twist therein) to act as torsional springs for causing the outer ends of the arms $e$ to move inwardly, and their pendent pins $e'$ to therefore maintain a constant engagement with the edge of the cam-wheel B, which lies below the lower end of the vacuum-chamber C and below the spider-arms $c^4$. Special springs, however, may readily be applied for attaining that end.

As thus far described, it will be readily understood that, as the die-table and the cam-wheel B thereon intermittingly revolve, the several cupules are thereby caused to swing to and fro in proper time, and that when the die-table stops after each movement each of the cupules rest either exactly over a die or away from one, and that the vertical reciprocation of the vacuum-chamber moves all of said cupules in a vertical line toward or from the dies, when located above them.

I deem my arrangement of the cupules concentrically with the line of the axis of the die-table, and the location of the mechanism by which the cupules are laterally vibrated centrally above the die-table, of great practical importance, because the dies and the feeding mechanism should be readily accessible, not only with reference to convenient manipulation, but also with reference to ready observation of the working parts. This desirability of locating active feeding mechanism mainly within the area of the circle occupied by the dies prompted me to work out the feeding problem on the pneumatic principle, as I recognized the practical difficulties of thus arranging feeding devices by which the button parts would be mechanically grasped or engaged and mechanically released when within or above a die. Some of the mechanism devised by me, however, may obviously be profitably employed with devices which operate after the manner of nippers.

I will next describe the valve mechanism, whereby atmospheric connection is alternately made and broken between the cupules and the vacuum-chamber.

Referring to Figs. 3 and 4, it will be understood that the flexible tubes $d^5$, which connect the cupules with the local vacuum-chamber C, do so via the hollow necks $f$, which enter said chamber radially, and each of these contains a vertical valve-seat, $f'$, occupied by a vertically-sliding plug-valve, $g$, with a single lateral port, clearly shown. These necks $f$ are arranged in pairs, side by side, but on nearly opposite sides of the vacuum-chamber, and each pair of valves is coupled by a walking-beam, $g'$ $g^2$. Although there are six cupules, four necks, $f$, serve for all of them, because one neck of one pair, controlled by beam $g'$, serves for the tuft-cloth and the other for the collet and the finished button, and the other pair of necks, controlled by beam $g^2$, serve, respectively, one for the cloth cover and the other for both the shell and the paper filling. The valves in each pair, being coupled, so operate that when one is closed the other is opened, and their movements are in harmony with the vertical movement of the cupules, so that some of them may release when at their lowest point, and others pick up, according to their respective positions with relation to the dies.

The valve-operating mechanism is made adjustable for varying the tenacious capacities of the cupules, as follows: Each plug-valve has in its lower end a screw-plug, $g^3$, by which said plugs may be elongated for purposes of adjustment.

Upon a collar, $h$, (loosely surrounding the vacuum-chamber C, below the valves, and firmly supported by the bracket $h'$, projecting from the frame of the machine,) an annular valve-plate, $i$, is rotatively mounted, and it is provided with holes $i'$—one for each valve— so that when said valve-plate is in one position two of said holes $i'$ will be entered by the lower ends or adjusting-screws of one of the valves of each pair, and the other two holes $i'$ will be out of coincidence with the screws of the other valves of each pair, causing an abutting contact of said plate with said valves, and, therefore, as this plate is rotatively moved to and fro, and the vacuum-chamber and valves are vertically reciprocated, the valves of each pair are alternately raised and lowered, thus opening and closing in proper time the atmospheric connections between the several cupules and the local vacuum-chamber. The rotative movement of the valve-plate $i$ is effected by means of the bell-crank lever $k$, the axis of which is mounted in vertical bearings upon one of the arms of the spider $C^4$, Fig. 2.

Upon the upper arm of the lever $k$ is a rigid vertical pin, $k'$, which occupies a radial recess, $i^2$, in the edge of the valve-plate, as clearly seen in Figs. 3 and 4, and to said upper arm a retractile spring, $k^2$, is applied, for causing the valve-plate to return to and occupy a certain normal position, except when held therefrom, by the cam-wheel B, Fig. 2, which engages with a rigid pendent pin, $k^3$, on the lower arm of lever $k$, Figs. 2 and 4, and said cam-wheel therefore imparts a proper rotative movement to the valve-plate in one direction, the spring causing it to make its return movement. The movement of the valve-plate being quite limited in its extent, and the pitch or capacity of the cam-wheel being much greater than is required for moving said plate, the lever is provided with a stop-plate, $l$, adjustably mounted on its upper arm, which, by engaging or abutting at its lower horizontal end, $l'$, against the side of the spider-arm $c^4$, on which the lever $k$ is mounted, so far overcomes the power of the spring $k^2$ as to normally maintain the pendent pin $k^3$, as seen in Fig. 2, away from contact with the edge of the cam-wheel B, except near the outer ends of the curves thereof.

I will next describe the means for separately presenting the several parts of a button so that the cupules may automatically deliver them to the dies. The shells of buttons of this class are composed of sheet metal, and one of them is shown in diametrical section at $m$, Fig. 8. They are delivered top upward into the preliminary dies $a$, and must therefore be presented in the same manner to the cupule D. The button-shells are massed in a receptacle, E, which may be constructed as heretofore, and provided with well-known stirring mechanism and a chute. When presented to the cupule, the shells must be top side up, and they may be made to pass from the receptacle bottom side up into a chute, and be turned over during their descent therein in a manner well known, or delivered to the chute top side up, as is preferred by me. The chute E' is novel, in that it is constructed so that it can only receive a button-shell when top side up, as seen in Fig. 8, and especially in that it is hinged at its top and is at its lower end supported by a spring, $m'$, on a vertical standard, as shown at the collet-chute G', Fig. 1, whereby, when the cupule D comes down upon the top of a shell, it forces the shell and the lower end of the chute slightly downward, during which movement of the chute and shell the air-valve opens, and therefore an air-tight connection is secured between the shell and the mouth of the cupule before the latter completes its downward movement, and also before its valve is opened. The receptacles F and F', respectively for the cloth-disk covers and cloth-disk tufts, are of the same character, and vary only in diameter of the tubes. Separately considered, each tubular receptacle is not novel, such having been used in trunk-nail machines, in combination with the vertical-sliding plunger, cord, and pulley, as shown in Fig. 13; but it is novel to combine a series of cylindrical receptacles with a pivoted circular carriage, $n$, capable of being rotated, and provided with a top plate, $n'$, circularly perforated to receive the receptacles, and with pin-catches $n^5$, for securing said cloth-receptacles against the upward thrust of the piston $n^2$ against their contents. This construction and combination not only permits a prompt change from an empty to a full receptacle by rotating the table, but also permits the removal of an empty receptacle for filling the same and the replacing of it without in any manner interfering with the operation of the machine. A stationary annular plate, $n^3$, surrounds the base of the carriage, and serves as a bottom for the receptacles, except at one side coincident with the plunger, where it is perforated to correspond with the interior of the receptacle, which is located for immediate use. Instead of this annular plate common to all the receptacles, each receptacle may be internally provided at its lower end with a detachable or permanent ring of sufficient width to prevent the cloth disks from falling out, and having an opening large enough to receive the piston.

The periphery of the carriage is notched at regular intervals, and a spring-pawl, $n^4$, by engaging with either of said notches, firmly locks the carriage in position when one of its receptacles is occupied by the plunger. Each of these groups of cloth-receptacles are so placed with relation to the die-table and their respective cupules that one receptacle of each group will exactly occupy the outer terminus of the line traversed by the cupules D' and D³ in their swinging movement.

The collet-receptacle G may, like the shell-receptacle E, be variously constructed. The collets have the usual central eye, and are cup-shaped, as shown by the collet in section at $o$, Fig. 9. Like the shells, the collets must not only be presented in a regular line, but, unlike the shells, they must be presented hollow side up to the cupule D², and mechanism for assuring this particular position may readily be applied; but the plain pans E and G may be profitably employed with chutes of reasonable length, and reliance had upon supplying the chutes by hand, one person being capable of thus supplying many machines. The inclined conducting-chute G' is preferably so constructed in lateral section that collets can enter at the end only when right side up. I have shown at Fig. 9 a central longitudinal bar, $o'$, which, with the chute shown, will prevent the collets from entering except hollow side up; but it is not essential if the distributing mechanism employed in the hopper be accurate in its operation, or, in lieu thereof, if the attendant be ordinarily careful. The pasteboard or paper fillings used in these buttons, being mere flat disks, varying only in diameter and thickness, according to the character of the buttons desired, may be presented either side up to the cupule D⁴. The filling-hopper H contains an intermittingly-revolved "stirrer" similar to those employed in other classes of machines involving an automatic delivery of parts, and any well-known mechanism suitable therefor may be used in this connection. The opening movement of the valves before described occurs during the last portion of the downward movement of the cupules, and they are only fully opened when said cupules have completed their downward movement. In order to attain good results, the cupules should have their mouths closed by contact with a button part before the valves open, and while I am aware that this may be effected by a prompt action of the valves operated by mechanism independent (in matter of time) of the reciprocating plungers, I prefer to attain that end by other means, as described in connection with chute E', and also as in a modified arrangement next described.

The inclined conducting-chute H', for the paper fillings, at its lower end is provided with a circular spring-plate, $p$, upon which a filling-disk rests ready for removal by cupule $D^4$, which enables said cupule, prior to terminating its downward movement in contact with the filling-disk, to so close its mouth thereon, before the proper valve opens, as to insure the best possible effect of the atmospheric pressure.

Instead of the filling hopper and chute, a series of cylindrical receptacles may be employed similar to those shown for the cloth-disks. All of the chutes at their lower ends are horizontal and adjacent thereto, have no inwardly-projecting side flanges, and all of them have a stop-plate, $q$, against which the lowest shell, collet, or filling abuts edgewise while partially supporting the inclined line of occupants in their respective chutes. The box for receiving the finished buttons is shown at K.

In Fig. 10 I show a main vacuum-chamber, I, which is connected to the several local vacuum-chambers C on each machine by the system of pipes $r$. An air-pump, $s$, continuously operated, exhausts the air from the main chamber, whereby an atmospheric pressure at the mouths of the several cupules may be attained of from three to ten pounds to the square inch, thus affording a high degree of tenacity and consequent reliability in operation. The fact that each shell, collet, and filling is yieldingly supported at the lower end of the chute enables the cupules to so thoroughly close their mouths as to be practically silent during the engaging and picking up of the parts. As a rule, the cloth-disk cupules should be operated at a comparatively low atmospheric pressure, because, if too high, more than one cloth disk will be liable to be lifted; but this can be quite readily gaged by a proper adjustment of the valves. So far as my experience goes, I have had no difficulty in obtaining a sufficiently prompt release of the parts from the cupules by merely closing the valves; but the release may readily be accelerated, if desired, by so grooving the valve-plug in an obvious manner as to admit air into the flexible tube $d^5$ as soon as communication between it and the vacuum-chamber is closed. The local vacuum-chambers on each machine may be relied upon for good service, whether each be connected directly with an air-pump common to all or to a pump of its own; but in all cases the operation of the pump should be continuous, so as to maintain a proper degree of working-vacuum within the local chambers. When the main vacuum-chamber is employed, the dimensions of the local chambers may obviously be materially reduced.

The operation of my machine, in view of the detailed description, will be readily understood to be as follows: The die-table intermittingly revolves in the direction of the arrows, the distance traveled each time by the dies being equal to the distance between their centers. As shown in Fig. 2, the shell-cupule D has deposited a shell in one of the preliminary dies $a$, with the flange of the shell downward; the filling-cupule $D^4$ has just deposited a filling in a finishing-die, $b$, which already has received a collet and tuft disk; the cloth tuft has also just been deposited by the cupule $D^3$ within a collet already therein, and the cupule $D^5$ has fastened upon a finished button in a finishing-die. The cloth-cover cupule $D'$ and the collet-cupule $D^2$ are respectively in contact with a cloth dish and a collet at their respective receptacles. Under these circumstances the valves of cupules D, $D^3$, and $D^4$ are closed, and the valves of cupules $D'$, $D^2$, and $D^5$ are open. The cupules all rise simultaneously with the plungers $a'$ and $b'$, and then rest. When the die-table next revolves, the cam-wheel swings the cupules D, $D^3$, $D^4$, and $D^5$ outwardly, the latter taking with it a finished button, until all are above their proper receptacles or chutes, the cupule $D^5$ being above the spout of receiving-box K. Said cam-wheel at the same time swings the cupules $D'$ and $D^2$ inwardly, whereupon the die-table rests. The plungers, local vacuum-chamber, and valves next descend, until the valves are shifted by contact with the valve-plate, causing a release of the cloth-disk cover from cupule $D'$ into one of the preliminary dies $a$ upon a shell already therein, and the collet from cupule $D^2$ into another of the finishing-dies $b$, and also causing the cupules D, $D^3$, $D^4$, and $D^5$ to respectively engage with a shell, a cloth tuft, a filling, and a finished button. Thereafter the plungers and cupules rise again, ready for their next lateral or swinging movement by the rotation of the die-table, and so on, repeating said movement as described.

As hereinbefore stated, the shell and its cloth cover deposited in the preliminary dies $a$ are taken up by the hollow plunger $a'$, within which they are held with the flange of the shell downward in a manner well known, so that when forced into a properly-charged finishing-die, $b$, the flange of the shell is clinched around the collet, and the edge of the cloth cover is firmly clamped between the shell and collet.

While I prefer a machine constructed and organized with the several devices and combinations of elements as shown and described, I do not limit myself thereto, for I am well aware that many of my devices and novel combinations of elements may be employed separately in machines otherwise variously organized.

Having thus described my invention, I claim as new and desire to secure by Letters Patent—

1. The combination, substantially as hereinbefore described, of the intermittingly-revolved die-table in a button-making machine, one or more feeding-cupules, an air-pump, a vacuum-chamber, and valve mechanism for controlling communication between the cupules and vacuum-chamber and causing said cupules to engage with and release the parts of a button.

2. The combination, substantially as hereinbefore described, of the revolving die-table of a button-making machine, the series of dies in said table, the series of receptacles for parts of a button, a series of cupules or suckers provided with automatic valves, and mechanism for vibrating, lifting, and lowering said cupules.

3. The combination, in a button-making machine, with the revolving die-table, its series of dies, and the vertically-reciprocating plungers, of feeding-cupules moving vertically with said plungers, substantially as described.

4. The combination, in a button-making machine, of the intermittingly-revolved die-table, the intermittingly-reciprocating plunger, the feeding-cupules, and intermediate connecting mechanism, whereby said cupules are alternately moved vertically and swung laterally toward and from the dies on the table, substantially as described.

5. The combination, in a button-making machine, of the intermittingly-revolved die-table, the intermittingly-reciprocated plungers, the feeding-cupules, the receptacles or chutes for parts of a button, and the mechanism which operatively connects said die-table and plungers with said cupules, whereby said cupules are alternately moved vertically and swung laterally toward and away from said die-table and said receptacles or chutes, substantially as described.

6. The combination, substantially as hereinbefore described, of the intermittingly-rotated die-table, a series of laterally-vibrating automatic feeding devices concentrically arranged above the die-table, and the intermittingly-rotated cam for swinging said feeding devices.

7. The combination, in a button-making machine, of a laterally-vibrating and vertically-reciprocated feeding-cupule, and an inclined conducting-chute which affords a yielding support for the lowest button part therein when pressed upon by the cupule, substantially as described.

8. The combination, substantially as hereinbefore described, of two or more feeding-cupules connected by two necks with a vacuum-chamber, of a pair of coupled sliding-valves—one in each neck—the rotative valve-plate, and means, substantially as described, for reciprocating the valve-plate, and also for causing the engaging contact of the valves and plate for alternately opening and closing said valves.

9. The combination, with the vertically-reciprocated vacuum-chamber, two or more cupules, and a pair of coupled valves, of the valve-plate, the cam-wheel on the die-table, and the intermediate lever, and a spring for rotating the valve-plate, substantially as described.

10. The combination, with the cupules, their coupled valves, and rotated valve-plate, of the adjusting-screws at the base of each valve-plug, for varying the tenacious capacities of the cupules, substantially as described.

11. The combination, in a button-making machine, of the intermittingly-rotating die-table and its dies, a feeding-cupule, a bell-crank lever, and an intermittingly-rotated cam-wheel, substantially as described.

12. The combination, with the cupules, of the torsionally-elastic pipes connecting them to the local vacuum-chamber, and serving as springs for effecting one swinging movement of the cupules, substantially as described.

13. The cupule $D^2$, provided with an annular mouth and central pad or cushion, substantially as described.

14. The combination, substantially as hereinbefore described, of a die-table, a series of tubes open at each end, and mounted upon a movable table, laterally-vibrating feeding mechanism for transferring the contents of said tubes to the die-table, and means for forcing the contents of either tube to one end thereof, and thereby delivering said contents progressively to the feeding mechanism, as set forth.

15. The combination of a series of feed-tubes open at each end, and mounted upon a movable table, and a plunger, substantially as described, whereby either of said tubes may be readily placed in line with said plunger, which forces its contents to one end thereof, as set forth.

DUNCAN H. CAMPBELL.

Witnesses:
 FRANK LEONARD,
 DANIEL McNIVEN.